Patented Feb. 12, 1935

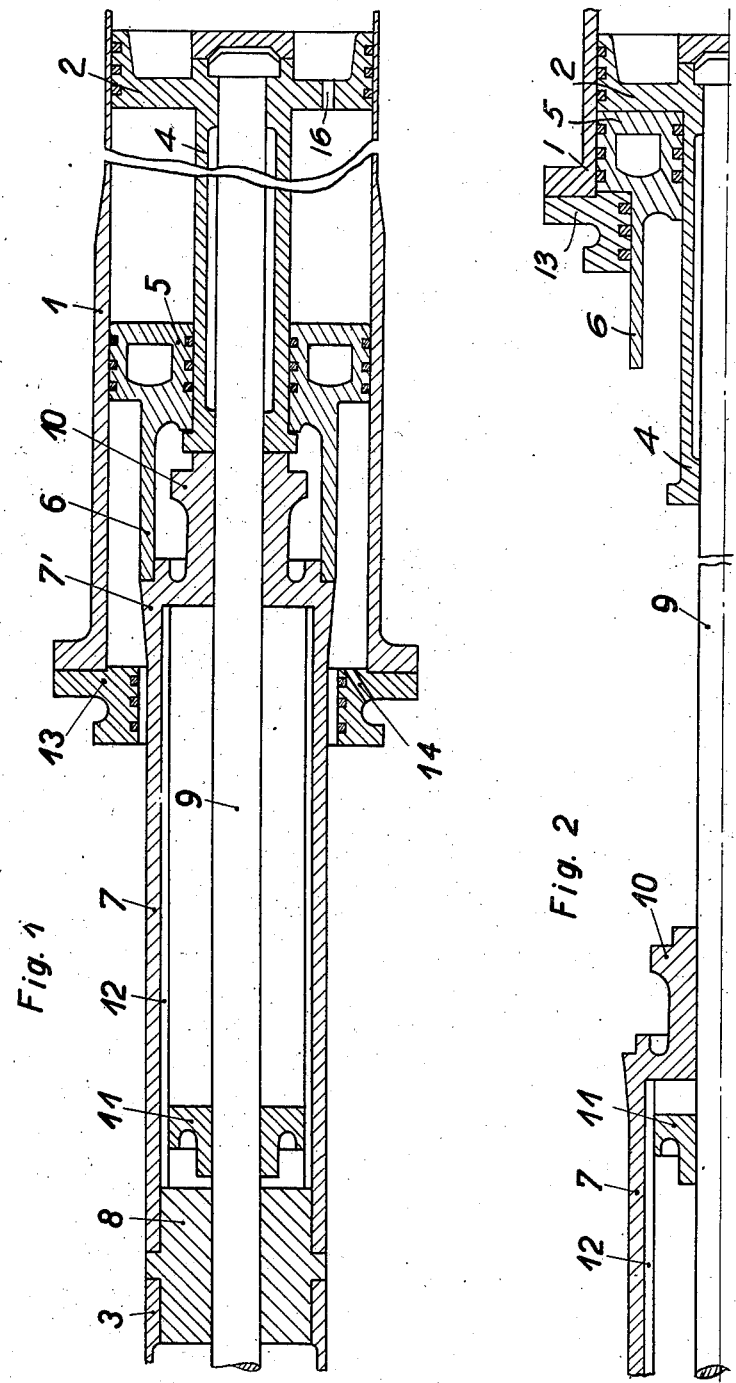

1,991,212

UNITED STATES PATENT OFFICE 1,991,212

BRAKING DEVICE FOR AIRCRAFT CATAPULTS

Hans Herrmann, Kiel, Germany

Application September 2, 1933, Serial No. 687,940
In Germany July 18, 1932

7 Claims. (Cl. 244—2)

This invention relates to an improved braking device for aircraft catapulting apparatus, the chief object being the provision of a device of the character which will eliminate very strong shocks being exerted, as hitherto, when the device is first put into action, since it is important in aircraft catapults that the masses in motion should be brought to rest as quickly as possible after the aircraft has been catapulted.

According to the present invention there is provided a braking device for aircraft catapulting apparatus having a hydraulic brake, wherein elastic or yieldable means is positioned in front of the hydraulic brake.

In order that the present invention may be clearly understood and readily carried into effect the same will now be described more fully, by way of example, with reference to the accompanying drawing, in which:—

Figure 1 shows in longitudinal section the braking device in the position it occupies before the braking action begins, and Figure 2 shows the braking device in its position when the braking action has terminated.

Referring to the drawing, the numeral 1 indicates a cylinder and 2 indicates a piston which is slidable therein and effects the impelling of the aircraft by means of a hollow piston rod 3. A second piston 5 is slidably or displaceably mounted on a sleeve 4 associated in a suitable manner with the piston 2, the said piston 5 being also guided and adapted to slide in the cylinder 1. The piston 5 is provided with a sleeve 6 which engages or bears on a cylinder 7 connected with a block 8 adapted to slide on a rod 9 which is mounted in the piston 2 with a small axial play. The cylinder 7 is provided with a head 10 which bears on or against the sleeve 4 of the piston 2. The space limited by the block 8 and the head 10 in the cylinder 7, in conjunction with a piston 11 mounted on the rod 9, constitutes the hydraulic brake. The cylinder space at one side of the piston 11 is in communication with the space at the other side thereof by means of channels 12.

The elastic or yieldable means according to the present invention is positioned, as aforesaid, in front of the hydraulic brake, and consists, in the embodiment shown, of a pneumatic brake comprising two parts viz., a preliminary brake and a main brake, which come into action consecutively one after the other. The preliminary brake consists of the cylinder 1, the sleeve 6, the piston 5 and a cylinder cover or head 13, apertures 14 for the escape of the air which is being compressed during the braking action being provided in the cylinder cover 13.

The main brake is constituted by the pistons 2 and 5, the cylinder 1 and the sleeve 4.

As the piston and its piston rod 3 are moved forwardly by means of the compressed air, the piston 5 is carried along in the same direction by reason of a compressed air cushion provided between the pistons 2 and 5. The compressed air required for this purpose is tapped off from the working cylinder 1 and fed in through the openings 16 in the piston 2.

As soon as the aircraft has been catapulted the braking action starts and it is effected in the first instance by means of the compressed air brake. A conically shaped part 7' of the cylinder 7 enters an opening in the annular flange of the cover 13 whereby the preliminary brake chamber is gradually shut off. As the pistons 2 and 5 are pushed further forward, the air enclosed in the space between these two pistons is still further compressed. As soon as the pressure thus generated exceeds that of the air cushion in the main brake chamber, the forward motion of the piston 5 becomes slower than that of the piston 2 so that the two pistons begin to approach each other, thereby increasing the compression of the air in the main brake space. Whilst this is taking place the sleeve 6 of the piston 5 separates from the cylinder 7, whereas the sleeve 4 of the piston 2 still bears against the head 10 of the said cylinder 7. As the piston 2 is still further pushed forward by the compressed air, such piston is subjected to an increasing braking action by reason of the increasing compression in the principal braking chamber, whilst the cylinder 7, which actuates the slide or skid, moves on in an uninterrupted manner at first, so that the cylinder head 10 recedes from the sleeve 4. As the piston 11 is rigidly mounted on the rod 9, the cylinder head 10 approaches the piston 11 during the above mentioned movement, thus compressing the fluid medium between the head 10 and the piston 11. The hydraulic braking action thus created, therefore, acts only on the cylinder 7, the piston rod 3 and the actuating parts of the catapult device connected therewith, whereas the parts producing the forward motion, i. e. the pistons 2 and 5 and the parts connected therewith are already braked by means of the compressed air and are disconnected from the actuating parts. The compressed fluid medium gradually escapes through the channels 12 into the space behind the piston 11. By reason of this braking action the actual operating parts are gradually brought to rest.

Any sudden shocks that might occur as the hydraulic brake is put into action and during its further working, are absorbed resiliently by means of the compressed air brake and can therefore not act deleteriously or create sudden excessive stresses. As the piston 5 is being braked, the air enclosed in the preliminary brake chamber is blown off through the openings 14. These openings are of such dimensions that most of the compressed air has escaped into the atmosphere before the braking power of the piston 2 and the remaining pressure of the air, acts on the primary piston 5. The result of this is as follows:—

The air in the primary or preliminary chamber very quickly rises to pressures, and consequently temperatures which exceed the ignition temperature of the lubricating oil. If the braking power of the principal piston were also allowed to act on this air, its temperature would be raised still higher, thus creating a danger of the oil igniting. Such danger is, however, eliminated by the fact, that the time difference between the beginning of the braking action in the principal chamber and the complete stoppage of the pressure piston is utilized to empty or relieve the preliminary chamber.

The aforesaid elastic or resilient means positioned in front of the hydraulic brake, may, if desired, be designed in the form of a suitable spring. Further, the said yieldable or resilient means may be subdivided in which event the parts may be designed as spring means or spring means and a compressed air brake.

I claim:

1. In an aircraft catapulting apparatus, in combination, an impelling device, a hydraulic brake for braking said impelling device, and a plurality of shock-absorbing devices connected with said brake and adapted to operate prior to the action of said brake, said shock-absorbing devices being adapted to come into action consecutively one after the other.

2. In an aircraft catapulting apparatus, in combination, an impelling device, a hydraulic brake for braking said impelling device, and a plurality of compressed-air brakes connected with said hydraulic brake and adapted to operate prior to the action of said hydraulic brake, said compressed-air brakes being adapted to come into action consecutively one after the other.

3. In an aircraft catapulting apparatus, a rod, a hydraulic brake surrounding said rod, an impelling device connected with said brake, a cylinder surrounding said rod, said cylinder being adapted to be filled with compressed air, and a pair of independent pistons operable within said cylinder, said pistons and said cylinder serving as a pneumatic brake.

4. In an aircraft catapulting apparatus, a rod, a hydraulic brake surrounding said rod, an impelling device connected with said brake, a hollow cylinder surrounding said rod, a piston situated within said cylinder and connected with said rod, a cylinder cover adapted to be connected with said cylinder, said cylinder, said cylinder cover, and said piston forming a chamber adapted to be filled with compressed air, and a floating piston within said chamber, the last-mentioned piston subdividing said chamber into a preliminary shock-absorbing chamber and a main shock-absorbing chamber.

5. In an aircraft catapulting apparatus, a rod, a piston rod for impelling an aircraft surrounding the first-mentioned rod, a block connected with the second-mentioned rod, a cylinder connected with said block, a cylinder head firmly connected with said cylinder, the space within said cylinder and between said block and said cylinder head, being adapted to be filled with water, whereby a hydraulic brake is formed, another cylinder head surrounding said cylinder and adapted to come in contact therewith, another cylinder connected with the last-mentioned cylinder head, and surrounding the first-mentioned rod, a piston connected with the first-mentioned rod and slidable within the last-mentioned cylinder, a sleeve connected with said piston and mounted upon the first-mentioned rod, said sleeve being in contact with the first-mentioned cylinder head prior to the catapulting, and another piston surrounding said sleeve and slidable within the last-mentioned cylinder, the space within the last-mentioned cylinder head and the first-mentioned piston being adapted to be filled with compressed air, whereby shock-absorbing means are formed separating said sleeve from the first-mentioned cylinder head after the catapulting and braking said pistons, while the second-mentioned rod is subjected to hydraulic braking.

6. In an aircraft catapulting apparatus, a rod, a piston rod for impelling an aircraft surrounding the first-mentioned rod, a block connected with the second-mentioned rod and slidable upon the first-mentioned rod, a cylinder connected with said block, a cylinder head firmly connected with said cylinder, the space within said cylinder and between said block and said cylinder head being adapted to be filled with water, whereby a hydraulic brake is formed, another cylinder head surrounding said cylinder and adapted to come in contact therewith, another cylinder connected with the last-mentioned cylinder head and surrounding the first-mentioned rod, a piston connected with the first-mentioned rod and slidable within the last-mentioned cylinder, a sleeve connected with said piston and mounted upon the first-mentioned rod, said sleeve being in contact with the first-mentioned cylinder head prior to the catapulting and another piston surrounding said sleeve and slidable within the last-mentioned cylinder, an opening being formed in the first-mentioned piston to supply compressed air into the space within the last-mentioned cylinder and between the second-mentioned cylinder head and first-mentioned piston, whereby shock-absorbing means are formed separating said sleeve from the first-mentioned cylinder head after the catapulting and braking said pistons, while the second-mentioned rod is subjected to hydraulic braking.

7. In an aircraft catapulting apparatus, a rod, a piston rod for impelling an aircraft surrounding the first-mentioned rod, a block connected with the second-mentioned rod and slidable upon the first-mentioned rod, a cylinder connected with said block, a cylinder head firmly connected with said cylinder, the space within said cylinder and between said block and said cylinder head being adapted to be filled with water, whereby a hydraulic brake is formed, another cylinder head surrounding said cylinder and adapted to come in contact therewith, another cylinder connected with the last-mentioned cylinder head and surrounding the first-mentioned rod, a piston connected with the first-mentioned rod and slidable within the last-mentioned cylinder, a sleeve connected with said piston and mounted upon the first-mentioned rod, said sleeve being in contact with the first-mentioned cylinder head prior to the catapulting, and another piston surrounding said sleeve and slidable within the last-mentioned cylinder, the space within the last-mentioned cylinder and between the second-mentioned cylinder head and the first-mentioned piston being adapted to be filled with compressed air, whereby shock-absorbing means are formed separating said sleeve from the first-mentioned cylinder head after the catapulting and braking said pistons, while the second-mentioned rod is subjected to hydraulic braking, an opening being formed in the second-mentioned cylinder head for the removal of compressed air from the space between the second-mentioned cylinder head, the second-mentioned piston and the second-mentioned cylinder after the catapulting.

HANS HERRMANN.